United States Patent

[11] 3,601,456

[72] Inventor Myron D. Becker
 2848 Alto Vista Drive, Newport Beach, Calif. 92660
[21] Appl. No. 21,925
[22] Filed Mar. 23, 1970
[45] Patented Aug. 24, 1971

[54] ANTISKEW DEVICE FOR DRILL BIT BEARINGS
 17 Claims, 2 Drawing Figs.
[52] U.S. Cl. ................................................. 308/8.2, 308/207
[51] Int. Cl. .................................................. F16c 19/04, F16c 19/00
[50] Field of Search ........................................... 308/8, 207, 184, 212, 213

[56] References Cited
UNITED STATES PATENTS
3,214,225 10/1965 Warnery .................... 308/207

Primary Examiner—Martin P. Schwadron
Assistant Examiner—Frank Susko
Attorney—Fowler, Knobbe & Martens ABSTRACT: An antiskew device for ensuring proper alignment of roller bearings in roller cutter earth drilling bits is disclosed. The antiskew device aligns the roller bearings as they enter the race area where greatest force is applied to ensure that the force is applied equally along the surface of the roller bearings.

INVENTOR.
MYRON D. BECKER
BY
FOWLER, KNOBBE
& MARTENS
ATTORNEYS.

ANTISKEW DEVICE FOR DRILL BIT BEARINGS

This invention relates to an improvement in roller cutter type earth drilling bits and, more specifically, to an improvement in the roller bearing support system for such bits.

Roller cutter bits for earth drilling, which are known in the art, generally comprise a roller cutter, which includes specially hardened cutting teeth, mounted for rotation about a shaft. A plurality of such roller cutters so mounted may be used on a single drill.

These roller cutters are commonly mounted for rotation by means of roller bearings received in a space defined by inner and outer raceways.

During the drilling of deep wells, the drill bit is subjected to severe shocks and to heavy wear. The shocks and wear are caused by a combination of impact, abrasion, and high operating loads. During operation, each of the bearing assemblies may sustain an average operating load of several tons but the peak loads imposed on the bearings may be very much higher since the force is not applied equally to all of the bearings.

The load imposed on roller bearings is usually carried by only a few rollers at any given instant with the load being transmitted through the rollers from the outer raceway to the inner raceway.

The inner raceway is usually stationary, with respect to the outer raceway, and the space between the inner raceway and the outer raceway is usually slightly greater than is required to accommodate the roller bearings. This permits the roller bearings to roll freely in the raceways. During use both the roller bearings and the raceways wear slightly, thereby increasing the space between the raceways. The roller bearings are, therefore, received relatively loosely in the space between the raceways.

The force applied during use is, as previously indicated, applied unequally to the raceways and is usually applied in only one quadrant of the annular raceway space. This nonuniform application of force causes the outer raceway to shift such that the inner and outer raceways are not coaxial during operation and the space between the inner raceway and the outer raceway is greater at a point diametrically opposite the area of application of greatest force. As a result, the roller bearings are held so loosely between the raceways in the low force area that the rollers tend to skew. By skewing, I mean the tilting or turning of the roller bearing such that the roller bearing axis is no longer parallel to the axis of the raceway. For proper operation, the axis of the inner and outer raceways and the axis of the roller bearings should be parallel.

If the roller bearings enter the area where the greatest force is applied in a skewed position, the force is not applied equally along the length of the roller bearing surface but rather is applied at points on the surface, usually at the respective ends of the bearings. This causes the roller bearings to wear unevenly and, because of the great concentration of force at the relatively small areas of contact on the skewed roller bearing, the bearing surface tends to spall or chip, thereby increasing the rate of wear.

Some of the disadvantages of the prior art roller cutter earth drilling bit assemblies are reportedly overcome by providing a noncircular contoured inner raceway such that a larger number of roller bearings are in the area of applied force. The problem of skewing of the roller bearings, however, has not, to my knowledge, been recognized and no satisfactory solution to this problem has been proposed. It is, therefore, a principle purpose of this invention to provide a means for solving this problem by ensuring that the roller bearings enter the area of greatest force application in proper alignment.

According to this invention, an improved roller cutter drill bit bearing structure is provided which comprises the combination of an inner raceway, an outer raceway annularly spaced from the inner raceway for rotation relative thereto, a plurality of roller bearings received in the space between the raceways and means for aligning the roller bearings in the raceway as they enter the area of maximum applied force. The roller bearings are so aligned that the axes of the roller bearings entering the force area are substantially parallel to the axis of the inner raceway.

This invention, therefore, constitutes an improvement in drill bit roller bearing structures of the type in which a load is normally applied in a given direction and which includes an outer raceway, an inner raceway and roller bearings received between the raceways for transmitting the load. One of the raceways is normally fixed relative to the other raceway. Usually this is the inner raceway which is mounted on a shaft. The improved feature of this invention comprises means associated with the fixed raceway for aligning the roller bearings as they enter the load bearing quadrant of the raceway assembly such that the axis of each bearing is parallel to the axis of the raceway. This causes the load to be borne substantially equally along the entire longitudinal surface of the roller bearing, rather than being concentrated at points near the ends of the roller bearing.

A more specific feature of the invention is a drill bit roller bearing structure which includes means extending into the space between the raceways and located proximate the edge of the load bearing area for engaging the roller bearings as they approach the load bearing area and for aligning the axes of the bearings. The engaging means, according to a still more specific feature of the invention, is preferably resilient or resiliently mounted and, in specific embodiments, may comprise a rubber or other elastomeric roller or a roll spring.

Additional and more specific features and advantages of the invention will be apparent from the specification and from the drawings to which reference is made.

The figures illustrate a specific embodiment of the present invention in the environment of a downwardly acting roller cutter earth drilling bit, but it will be understood from the following discussion that the utility and advantages of the invention are not limited to this environment and that the invention may be used in conjunction with any roller bearing assembly in which the roller bearings are not confined in a cage and in which the force is applied nonuniformly to the bearing. It will also be understood that the specific embodiment illustrated is not the only form in which the invention may be constructed and that many alternative forms and variations may be made based upon the principle of the invention described herein without departing from the spirit and scope of the invention as claimed.

Figure 1:
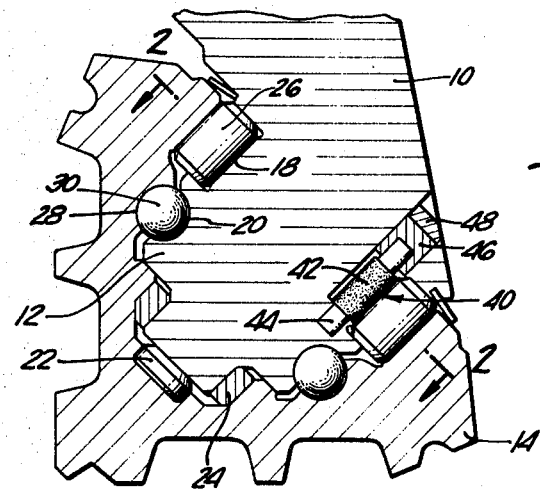
FIG. 1 is a vertical section of part of a bit head showing the roller cutter structure and the improved roller bearing structure of this invention.

In FIG. 1, a portion of the bit head 10 is illustrated. This bit head includes a shaft portion indicated at 12. Received about the shaft 12 for rotation is a roller cutter 14 which, in conventional design, includes a plurality of specially hardened cutting teeth. The particular configuration and construction of the roller cutter is not of primary importance in this invention. An inner raceway 18 for roller bearings and a second inner raceway 20 for ball bearings are formed as a part of, or attached to, the shaft 12. A thrust button 22 spaces the roller cutter 14 from the end of the shaft and a bushing 24 provides low friction alignment of the roller cutter on a friction pin portion of the shaft 12.

An outer raceway 26 for roller bearings and an outer raceway 28 for ball bearings, one of which is shown at 30, are formed as a part of, or affixed to, the roller cutter 14.

Figure 2:
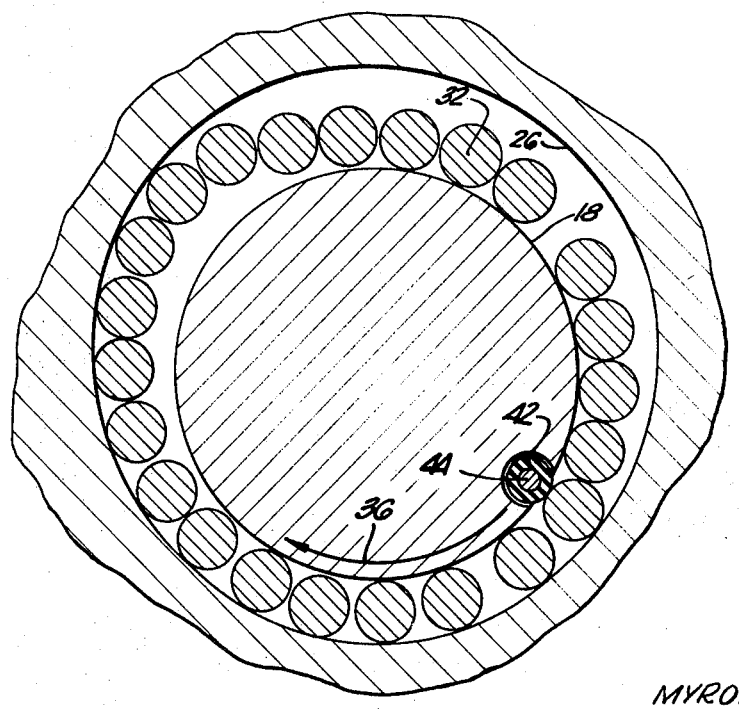
FIG. 2 is a sectional view taken substantially along lines 2—2 illustrating the relationship of the raceways, roller bearings and aligning means of the invention.

This invention is concerned primarily with the interrelationship of the inner race 18, the outer race 26, and a plurality of roller bearings 32, this relationship being best shown in FIG. 2.

The arrow 34, shown in FIG. 2, indicates the general direction of applied force. As the drawing illustrates, on an exaggerated scale, the outer raceway 26 receives the force and applies the force through the roller bearings 32 to the inner raceway 18, the force load being substantially borne by one quadrant of the fixed raceway 18. In the area diametrically opposite the area of maximum force application, the space between the inner raceway 18 and the outer raceway 26 is greatest. The roller bearings 32 are received relatively loosely in this area and have sufficient freedom of movement to tilt or skew relative to the raceway such that the roller bearing axes are not parallel to the axis of the inner raceway. The axis of the outer raceway is normally parallel to but not necessarily coaxial with the axis of the inner raceway, but the reference axis is taken for present purposes as the axis of the inner raceway.

While the annular space between the inner raceway and the outer raceway is exaggerated in the drawing, it will be understood that if the load were applied equally to all quadrants of the raceway assembly, then the space could properly be designed such that skewing was impossible. In the present instance, however, where the available space between the inner raceway and the outer raceway is concentrated on one side of the inner raceway, there is sufficient space to permit some skewing even in new roller bearing assemblies. The problem is, of course, aggravated as the roller bearings and the raceways wear during use.

As a result of this skewing, the roller bearings move around the race partly by rolling and partly by sliding. The contact between the roller in the skewed position and the raceway becomes essentially a point contact, instead of a line contact, thereby concentrating the load in a relatively small area of the bearing. The sliding travel is much more damaging to the rollers and to the raceways than rolling travel and it is desirable to minimize sliding. The essentially point contact, resulting from skewing, results in extreme load concentrations at the point of contact and premature fatigue spalling of the raceway and of the roller bearing. Once unequal wearing of the roller bearings or of the raceways begins, the overall rate of wear and fatigue is greatly increased.

Wear patterns have been observed which show conclusively that the roller bearings in prior art bearing structures enter the load bearing zone of the raceways in a position slightly skewed with respect to the axis of the inner race. The uneven wear of the roller bearing is readily observable upon inspection.

The serious problems resulting from the skewing and uneven wear of roller bearings is solved according to the present invention by ensuring alignment of the bearing axes with the axis of the inner raceway as the roller bearings enter the load bearing quadrant, indicated generally by arrow 36 in FIG. 2 for illustrative purposes.

According to this invention, therefore, means are provided in association with the fixed raceway for aligning the roller bearings as they enter the load bearing quadrant 36 such that the axes of the bearings are parallel to the axis of the inner raceway. This causes the load to be borne by line contact substantially equally along the entire longitudinal surface of the roller bearing and, thereby, prevents uneven wearing of the roller bearing surface.

The aligning means is referred to generally as a wiper because it is designed to engage each roller bearing as it approaches the load bearing zone and wipe the roller bearing surface to bring the roller bearing surface into alignment with the inner raceway. The wiper may be so constructed as to engage the roller bearings for partial sliding and partial rolling contact, for sliding contact or for rolling contact.

For maximum effectiveness and life, the wiper should be of a resilient composition or resiliently mounted so as to extend into the space between the inner raceway and the outer raceway for engaging the roller bearing surfaces. This prevents wear on the wiper and on the roller bearing. It is also desirable to construct the wiper in such a way that wear on the roller bearings is completely avoided.

One specific embodiment of the aligning means of this invention is illustrated in FIGS. 1 and 2. In this specific embodiment, a wiper assembly, shown generally at 40, comprises a rubber or other elastomeric roller 42 mounted for rotation by a shaft 44. In the illustrated embodiment, the shaft 44 is journaled at one end into the shaft 12 and supported at the other end by a journal 46. A keeper such as a weld filler 48 is provided to maintain the position of the wiping assembly.

In this embodiment of the invention the rubber roller 44 extends a small distance into the space between the inner raceway and the outer raceway so as to engage the roller bearings. The roller 42 is so constructed and disposed that its axis is parallel to the axis of the inner raceway and the surface of the roller forms a cylinder which is also parallel to the axis of the inner raceway. The surface of the wiper 42, which is in the form of a roller to provide a combination of sliding and rolling contact with the roller bearings, thus engages each roller bearing as it approaches the load bearing quadrant 36 and aligns the axis of the roller bearing with the axis of the inner race such that the roller bearing enters the load bearing area in proper alignment.

In the preferred embodiment, the roller 42 is composed of oil and water resistant rubber, which may be either natural or synthetic or a blend of natural and synthetic rubbers. There are certain advantages to be obtained from using particular elastomeric compositions, especially in terms of the life of the wiper. It is to be understood, however, that other elastomers, such as the silicone rubbers, certain of the polymers, etc., are generally equivalent for purposes of this invention. Indeed, no great amount of elasticity is required since the degree of compression of the wiper is very small. The same result can be used by replacing the elastomeric roller with a cylindrical helical roll spring which has a sufficient degree of resiliency.

The essential feature of this invention is that the aligning means is so constructed and arranged as to engage the roller bearings proximate the point at which the roller bearings enter the load bearing area for aligning the axis of the roller bearings with the axis of the inner raceway. This may be accomplished by the means illustrated in the figures, the roll spring described, or by other wiping means so constructed and designed as to engage the surface of the roller bearings and ensure the alignment of the axis of the roller bearings. The wiper should be composed of a resilient material or resiliently mounted for best results and maximum life. Thus, an elongate resilient wiper designed for proper engagement with the roller bearings and so placed as to align the roller bearings as they enter the load bearing zone constitutes the principle feature of the invention.

The invention, therefore, comprises the combination of an inner raceway, an outer raceway for rotation relative to the inner raceway, a plurality of roller bearings received in the space between the inner raceway and the outer raceway and means for aligning the roller bearings as they enter the load bearing quadrant of the raceway structure. The invention has been useful in, and has been described with respect to, downwardly acting earth drilling bits. The same type of construction is also useful in upwardly acting drilling bits, such as are used in mines, etc. Indeed, the invention is useful and may provide significant advantages in any roller bearing structure in which the load is applied nonuniformly to the raceways, there being one load bearing area which bears the greatest force.

With these principles in mind, variations and adaptations of the invention can easily be made by the skilled mechanic or engineer to utilize the invention in a variety of environments. The invention is not, therefore, limited to the specific embodiments disclosed and is limited only by the scope of the following claims. What I claim is:

1. In a drill bit roller bearing structure of the type in which a load is normally applied in a given direction and which includes an outer raceway, an inner raceway, one of said raceways being fixed relative to the other raceway, and roller bearings between the raceways, the load normally being substantially borne by one quadrant of the fixed raceway, the improvement comprising:

means associated with the fixed raceway for aligning the roller bearings as they enter the load bearing quadrant such that the axes of the roller bearings are substantially parallel to the axes of the raceways thereby causing the load to be borne substantially equally along the entire longitudinal surface of the roller bearings.

2. The improved drill as described in claim 1 wherein the aligning means comprises means associated with the fixed raceway extending into the space between the raceways proximate the edge of the load bearing quadrant for engaging the roller bearings as they approach the load bearing quadrant and for aligning the axes of the roller bearings.

3. The improved drill as defined in claim 2 wherein the aligning means comprises an elongate resilient member for engaging the roller bearings and aligning them.

4. The improved drill as defined in claim 3 wherein the aligning means comprises a cylindrical resilient member.

5. The improved drill as defined in claim 3 wherein the aligning means comprises an elastomeric member.

6. The improved drill as defined in claim 5 wherein the aligning member is cylindrical in form.

7. The improved drill as defined in claim 6 wherein the cylindrical aligning member is a rubber cylinder.

8. The improved drill as defined in claim 3 wherein the aligning means comprises a spring.

9. The improved drill as defined in claim 8 wherein the aligning means is a roll spring.

10. An improved drill bit roller bearing structure which includes the combination of:
an inner raceway,
an outer raceway annularly spaced from the inner raceway for rotation relative to the inner raceway,
a plurality of roller bearings received between the raceways, the drill bit being of the type wherein maximum force is normally applied to one area of the inner raceway, and,
means constructed and positioned for aligning the roller bearings entering the area of maximum applied force such that the axes of the roller bearings entering the force area are substantially parallel to the axis of the inner raceway.

11. The improved drill bit structure as defined in claim 10 wherein the aligning means comprises a resilient member so positioned and constructed as to engage and align the roller bearings as such bearings approach the area of maximum force application.

12. The improved drill bit structure as defined in claim 11 wherein the aligning member is in the form of a resilient cylinder.

13. The improved drill bit structure as defined in claim 11 wherein the aligning member is an elastomeric cylinder.

14. The improved drill bit structure as defined in claim 11 wherein the aligning means is a roll spring.

15. The improved drill bit structure as defined in claim 10 wherein the aligning means constitutes a wiper constructed and mounted to contact and align the roller bearings as they enter the area of maximum force application.

16. The improved drill bit structure as defined in claim 15 wherein the aligning wiper is so constructed and positioned as to resiliently contact the roller bearings for aligning such bearings.

17. An improved roller bearing structure for use in environments wherein force is applied unequally to the roller bearing structure with maximum force being applied substantially in one quadrant of the roller bearing structure, said structure comprising:
a stationary inner raceway,
an outer raceway spaced from the inner raceway for rotation thereabout,
a plurality of roller bearings received in the space between the inner raceway and the outer raceway, and
a resilient wiper so disposed and constructed as to engage the roller bearings proximate the point of entry of such roller bearings into the load bearing quadrant for aligning the roller bearings such that the axes of the roller bearings entering the load bearing quadrant are substantially parallel to the axis of the inner raceway.